United States Patent
Ketcham et al.

(10) Patent No.: US 10,399,905 B2
(45) Date of Patent: Sep. 3, 2019

(54) CERAMIC HOUSING WITH TEXTURE

(71) Applicant: CORNING INCORPORATED, Corning, NY (US)

(72) Inventors: Thomas Dale Ketcham, Horseheads, NY (US); Weiguo Miao, Horseheads, NY (US); Eric James Nichols, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/117,783

(22) Filed: Aug. 30, 2018

(65) Prior Publication Data
US 2019/0062219 A1 Feb. 28, 2019

Related U.S. Application Data

(60) Provisional application No. 62/552,560, filed on Aug. 31, 2017.

(51) Int. Cl.
*H04M 1/03* (2006.01)
*H04B 1/03* (2006.01)
(Continued)

(52) U.S. Cl.
CPC ............ *C04B 35/48* (2013.01); *B28B 7/0064* (2013.01); *B28B 11/0818* (2013.01);
(Continued)

(58) Field of Classification Search
CPC ... C04B 35/48; C04B 35/64; C04B 2235/602; C04B 2235/612; B28B 7/0064;
(Continued)

(56) References Cited

U.S. PATENT DOCUMENTS 5,681,635 A * 10/1997 Nelson ................ G11B 5/7325
428/141
6,623,595 B1 * 9/2003 Han ..................... C23C 16/4404
118/723 AN
(Continued)

FOREIGN PATENT DOCUMENTS

CN 205283991 U 6/2016
CN 106187170 A 12/2016
(Continued)

OTHER PUBLICATIONS

Blendell and Coble, "Measurement of Stress Due to Thermal Expansion Anisotropy in Al2O3", J. Am. Ceram. Soc. 65 [3] 174-178 (1982).
(Continued)

*Primary Examiner* — Andrew Wendell
(74) *Attorney, Agent, or Firm* — Kevin M. Johnson

(57) ABSTRACT

A housing for a portable electronic device includes a radio frequency transparent polycrystalline ceramic portion comprising a first surface and a second surface parallel to the first surface. The radio frequency transparent polycrystalline ceramic portion comprises a macro-texture on at least a portion of the first surface, and a predetermined micro-texture is disposed on at least a portion of the macro-texture. A method for manufacturing a housing for a portable electronic device includes forming a green ceramic article comprising a first surface and a second surface parallel to the first surface, embossing at least a portion of the first surface of the green ceramic article with a macro-texture, and sintering the green ceramic article comprising the macro-texture to form a sintered ceramic article. A predetermined micro-texture is disposed on at least a portion of the macro-texture.

20 Claims, 10 Drawing Sheets

(51) Int. Cl.
*C04B 35/48* (2006.01)
*B28B 17/00* (2006.01)
*G06F 1/16* (2006.01)
*C04B 35/64* (2006.01)
*H04B 1/3888* (2015.01)
*B28B 7/00* (2006.01)
*B28B 11/08* (2006.01)
*H04M 1/02* (2006.01)

(52) U.S. Cl.
CPC .......... *B28B 17/0009* (2013.01); *C04B 35/64* (2013.01); *G06F 1/1626* (2013.01); *G06F 1/1656* (2013.01); *H04B 1/3888* (2013.01); *H04M 1/0283* (2013.01); *C04B 2235/602* (2013.01); *C04B 2235/612* (2013.01); *G06F 2200/1634* (2013.01); *H04M 1/0202* (2013.01)

(58) Field of Classification Search
CPC . B28B 11/0818; B28B 17/009; G06F 1/1656; G06F 1/1626; G06F 2200/1634; H04M 1/0283; H04M 1/0202; H04M 1/185; H04M 1/03; H04B 1/3888; H04B 1/03
See application file for complete search history.

(56) References Cited

U.S. PATENT DOCUMENTS

| | | | |
|---|---|---|---|
| 7,947,213 B2 | 5/2011 | Badding et al. | |
| 9,187,841 B2 | 11/2015 | Lai | |
| 9,232,659 B2 | 1/2016 | Chiang et al. | |
| 9,478,213 B2 | 10/2016 | Tajima | |
| 9,867,298 B2 | 1/2018 | Hwang et al. | |
| 2006/0216533 A1* | 9/2006 | Kobayashi | C04B 35/581 428/469 |
| 2006/0268528 A1 | 11/2006 | Zadesky et al. | |
| 2006/0275625 A1 | 12/2006 | Lieberman | |
| 2009/0141459 A1 | 6/2009 | Weber | |
| 2010/0279068 A1 | 11/2010 | Cook et al. | |
| 2010/0285275 A1 | 11/2010 | Baca et al. | |
| 2011/0220285 A1 | 9/2011 | Lee et al. | |
| 2013/0078398 A1 | 3/2013 | Weber | |
| 2015/0083227 A1 | 3/2015 | Bidkar et al. | |
| 2015/0217479 A1 | 8/2015 | Weber et al. | |
| 2015/0231594 A1* | 8/2015 | Aguilar-Mendoza | G02B 1/12 385/141 |
| 2015/0381780 A1 | 12/2015 | Hidaka et al. | |
| 2016/0090326 A1 | 3/2016 | Matsuyuki et al. | |
| 2017/0098151 A1* | 4/2017 | Herslow | B32B 33/00 |
| 2018/0047557 A1* | 2/2018 | Odnoblyudov | C23C 16/401 |
| 2018/0070463 A1* | 3/2018 | Ely | B28B 11/001 |
| 2018/0240902 A1* | 8/2018 | Odnoblyudov | H01L 29/41766 |

FOREIGN PATENT DOCUMENTS

| | | |
|---|---|---|
| JP | 2007173585 A | 7/2007 |
| WO | 2012086986 A2 | 6/2012 |
| WO | 2015026169 A1 | 2/2015 |

OTHER PUBLICATIONS

Coble, "A Model for Boundary Diffusion Controlled Creep in Polycrystalline Materials," Journal of Applied Physics, vol. 34, No. 6, 1963, pp. 1679-1682.

Herring, "Diffusional Viscosity of a Polycrystalline Solid" J. Applied Physics, 21, 437-445 (1950).

Olson and Cohen, "A general mechanism of martensitic nucleation: Part I. General concepts and the FCC-HCP transformation", Met. Trans. A. vol. 7A, No. 12, pp. 1897-1904.

Wu et al., "The m—t Transformation and Twinning Analysis of Hot-Pressed Sintered 3YSZ Ceramics" J. Am. Ceram. Soc., 94 [7] 2200-2212 (2011).

International Search Report and Written Opinion PCT/US2018/049007 dated Jan. 4, 2019, 13 Pgs.

* cited by examiner

CERAMIC HOUSING WITH TEXTURE

CROSS-REFERENCE TO RELATED APPLICATIONS

This application claims the benefit of priority of U.S. Provisional Application Ser. No. 62/552,560 filed on Aug. 31, 2017, the contents of which are relied upon and incorporated herein by reference in their entirety.

BACKGROUND

Field

The present specification generally relates to housings for portable electronic devices having textures and, more specifically to housings for portable electronic devices having a micro-texture disposed on at least a portion of a macro-texture.

Technical Background

Portable electronic devices, such as, for example, cellular phones, smart phones, tablet computers, laptop computers, navigation systems, watches, activity monitors, etc., are ubiquitous in today's society. For many of these devices, at least a portion of the exterior of the device needs to be radio frequency transparent so that the device can communicate with satellites, cellular towers, wi-fi routers, and other devices. Hard ceramic materials have been proposed as radio transparent materials that can be used as housings for such portable devices. However, many ceramics have low fracture toughness and can fracture or chip when dropped. Further, polished ceramics can be slippery when covered with hand prints, oils, and aqueous salts, leading to the unintentional dropping of the devices. The hand prints are also not aesthetically pleasing on a polished surface.

Accordingly, a need exists for radio transparent hard ceramic materials that reduce the likelihood of dropping as well as limit the aesthetic effects of hand prints and other smudges.

SUMMARY

According to one embodiment, a housing for a portable electronic device includes a radio frequency transparent polycrystalline ceramic portion comprising a first surface and a second surface parallel to the first surface. The radio frequency transparent polycrystalline ceramic portion comprises a macro-texture on at least a portion of the first surface, and a predetermined micro-texture is disposed on at least a portion of the macro-texture.

In another embodiment, a method for manufacturing a housing for a portable electronic device includes forming a green ceramic article comprising a first surface and a second surface parallel to the first surface, embossing at least a portion the first surface of the green ceramic article with a macro-texture, and sintering the green ceramic article comprising the macro-texture and the micro-texture to form a sintered ceramic article. A predetermined micro-texture is disposed on at least a portion of the macro-texture.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of ceramic housings for portable electronic devices that include a macro-texture and a predetermined micro-texture disposed on at least a portion of the macro-texture, and methods for making such ceramic housings. According to one embodiment, a housing for a portable electronic device includes a radio frequency transparent polycrystalline ceramic portion comprising a first surface and a second surface parallel to the first surface. The radio frequency transparent polycrystalline ceramic portion comprises a macro-texture on at least a portion of the first surface, and a predetermined micro-texture is disposed on at least a portion of the macro-texture. Various embodiments of housings for portable electronic devices and methods for forming such housings according to embodiments will be described with reference to the appended drawings.

As used herein, "green housing" or "green ceramic" are used interchangeably and refer to unsintered housings or ceramic materials including ceramics where the sintering process has begun, but has not been completed, such as where the sintering process is suspended so that the ceramic can be further machined and then recommenced when the machining is completed, unless otherwise specified.

As used herein, a "wt %," "weight percent," or "percent by weight" of an inorganic or organic component, unless specifically stated to the contrary, is based on the total weight of the total organics and inorganics in which the component is included. As used herein, a "vol %," "volume percent," or "percent by volume" of a component, unless specifically stated to the contrary, is based on the total volume of the composition in which the component is included.

Figure 1A:
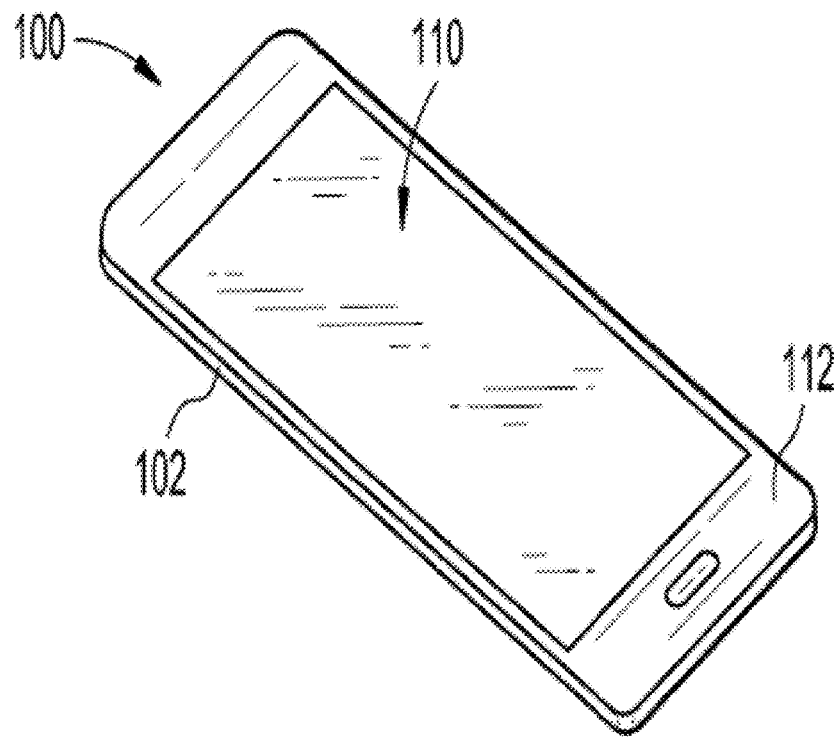
FIGS. 1A and 1B schematically depict an electronic device having a housing according to embodiments disclosed and described herein.
Figure 1B:
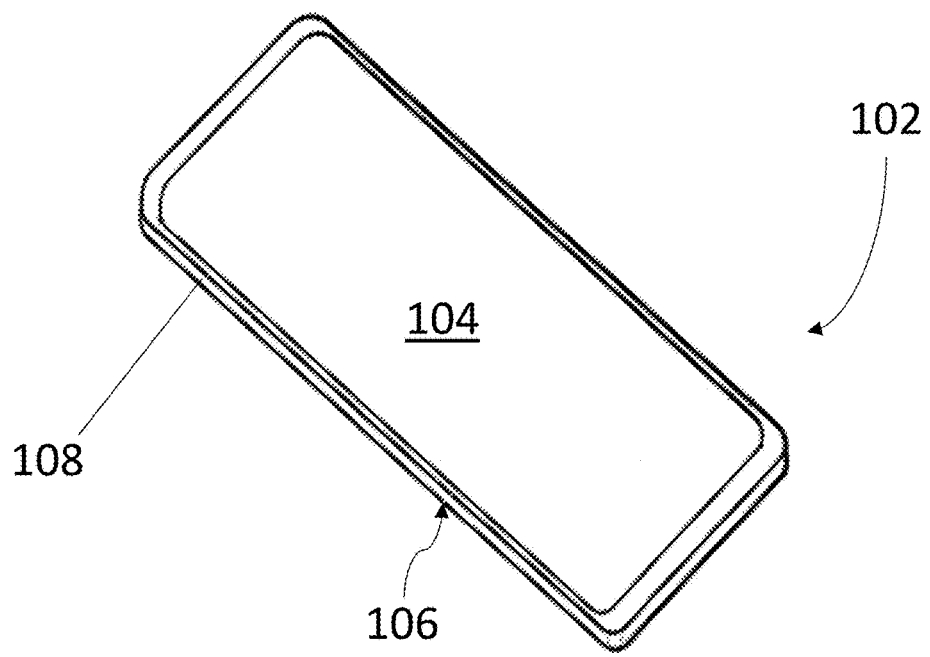

With reference now to FIGS. 1A and 1B, which depict an embodiment of an electronic device, the electronic device 100 including a housing 102 having front 104 (second surface), back 106 (first surface), and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In one or more embodiments, the second surface 104 is parallel to the first surface 106. In various embodiments, the housing 102 is mechanically attached to the display 110 and the cover substrate 112. According to some embodiments, when the housing 102 is attached to the display 110 and the cover substrate 112, the back 106 and side surfaces 108 of the housing 102 are exposed, while the front 104 of the housing 102 is generally covered by the display 110 and the cover substrate 112.

It is currently desirable for portable electronic devices 100 to be relatively thin, thereby increasing the portability of the electronic device 100. The thickness of the housing 102 is defined as the thickness between the back 106 (first surface) and the front 104 (second surface) of the housing 102. To this end, in some embodiments, the thickness of the housing is less than or equal to 5 mm, such as less than or equal to 4 mm, less than or equal to 3 mm, less than or equal to 2 mm, or less than or equal to 1 mm. It should be understood that the above ranges include all subranges within the stated ranges. The other dimensions (i.e., the length and width) of the electronic device 100 will be determined based on the desired use of the portable electronic device. For instance, a smart phone will have smaller length and width than a tablet computer, but for both a smart phone and a tablet computer, it is desirable for the thickness to be relatively small.

As noted above, the housing 102 of an electronic device 100 can be made from a polished ceramic material. This polished ceramic material can make the electronic device 100 slippery and lead to more frequent dropping of the electronic device 100—particularly when the back 106 of the housing 102, which contacts a hand is made from polished ceramic material. Further, because the back 106 of the housing 102 is frequently contacted by hands and surfaces (such as, for example, desks, tables, countertops, etc.) upon which the electronic device 100 is laid, the back 106 of the housing 102 frequently will have smudges or stains from oils or aqueous compositions. These smudges or stains can diminish the positive aesthetic effect of the ceramic housing 102, and can also harbor microorganisms that can transmit contagions.

To address the above, and other, concerns, embodiments of housings disclosed and described herein include a housing 102 where at least a portion of the back 106 of the housing 102 has a macro-texture and a predetermined micro-texture disposed on at least a portion of the macro-texture. It should be understood that in some embodiments, the entire back 106 of the housing 102 may comprise a macro-texture while, in other embodiments, only a portion (i.e., less than the entirety) of the back 106 of the housing 102 may comprise a macro-texture. In addition, various embodiments may include a macro-texture on the front 104 of the housing 102. For instance, in some embodiments where the housing is relatively thin, embossing the green ceramic housing can form a macro-texture on both the front 104 and the back 106 of the housing 102. Likewise, in some embodiments, a predetermined micro-texture can be formed on at least a portion of the housing 102 that comprises the macro-texture. In one or more embodiments, the predetermined micro-texture may be formed on the entire portion of the housing 102 that comprises the macro-texture. As utilized herein, the micro-texture has a depth that is less than a depth of the macro-texture. In some embodiments, the micro-texture has a maximum limiting dimension, as defined below, that is less than a maximum limiting dimension of the macro-texture.

In some embodiments, a macro-texture is applied to at least a portion of the back 106 of the housing 102 of an electronic device 100. According to some embodiments, the macro-texture provides a tangible texture to the housing 102 of the electronic device 100 that allows the user to establish a better hold on the electronic device 100, which decreases the frequency of which the electronic device is dropped. Further, the macro-texture provides an uneven surface that reflects light and colors at many different angles, thus decreasing the undesirable aesthetic effect of oil-based or aqueous smudges and stains that are present on the housing 102 of the electronic device 100.

The geometry of the macro-texture is not particularly limited and may be, in some embodiments, a periodic, repeating array of geometrical shapes. In other embodiments, the macro-texture may be a one-off, non-repeating geometry of varying shapes and sizes, sometimes referred to as "random." For instance, in one or more embodiments, the macro-texture may be one or more scripts, emblems, logos, or other recognizable geometrical shape, pattern, or character. In other embodiments, the macro-texture may be repeating scripts, emblems, logos, or other recognizable geometrical shapes, patterns or characters. Additionally, in one or more embodiments, a macro-texture may be overlapped with another macro-texture. As a non-limiting example, a first macro-texture may be a geometrical pattern, such as, for example a herringbone or chevron pattern, and a second macro-texture, such as one or more scripts, may be disposed on the first macro-texture, such that the second macro-texture comprises the first macro-texture (i.e., a script having a herringbone or chevron patter within the script).

Figure 2A:
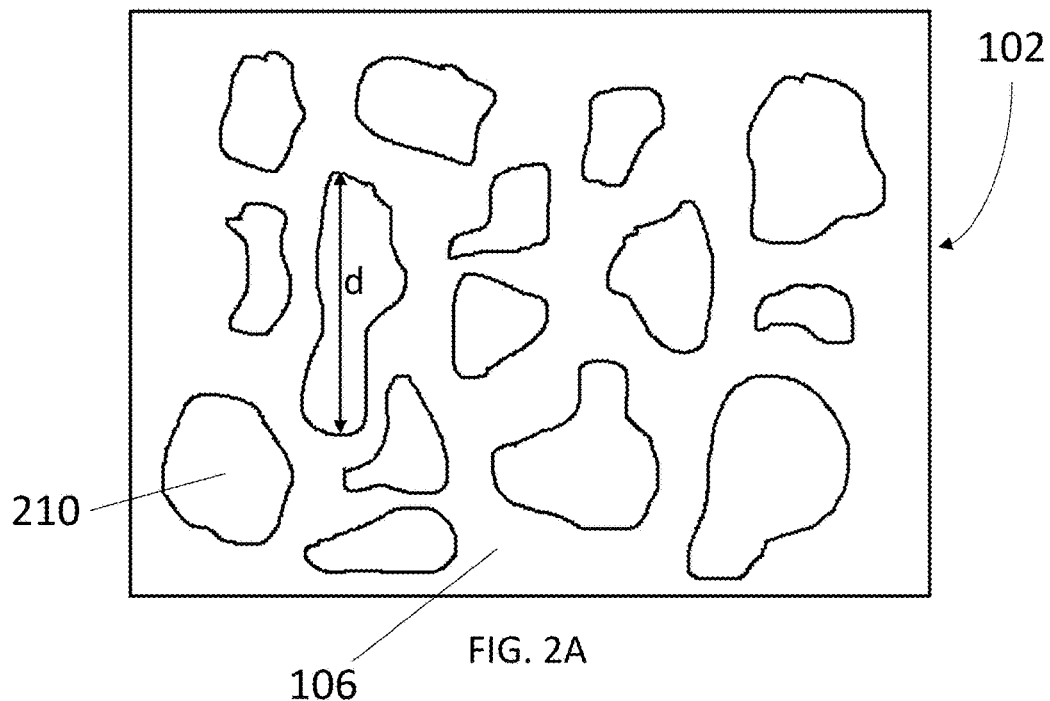
FIGS. 2A and 2B schematically depict plan views of ceramic materials having macro-textures according to embodiments disclosed and described herein.

With reference now to embodiments depicted in FIG. 2A, which is a schematic plan view of a portion of a housing 102 for an electronic device 100 comprising a macro-texture 210 on back 106 of the housing 102. The macro-texture 210 is a randomly shaped macro-texture 210 that has a bubble-like geometry. It should be understood that in other embodiments, the macro-texture 210 can be of a more consistent, uniform shape and, in some embodiments, the macro-texture 210 may be a periodic array or repeating geometrical design. It should also be understood that the macro-texture 210 in FIG. 2A is not necessarily drawn to scale and that bubble-shapes with smaller or larger dimensions may comprise the macro-texture according to some embodiments. The spacing between the bubble-like geometries that comprise the macro-texture 210 is not particularly limited and will be constrained only by the materials being used to form the housing 102 and the apparatus used to form the macro-texture.

Figure 2B:
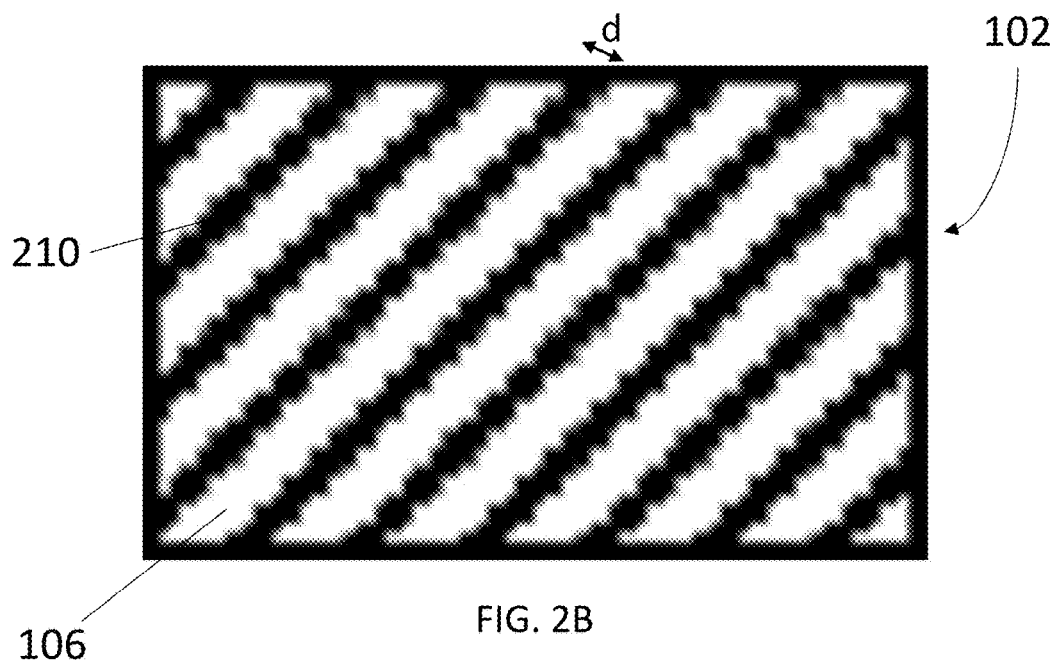

With reference now to embodiments depicted in FIG. 2B, which is a schematic plan view of a portion of a housing 102 for an electronic device 100 comprising a macro-texture 210 on the back 106 of the housing 102, the macro-texture 210 may be a series of lines extending across at least a portion of the back 106 of the housing 102. In some embodiments, the lines comprising the macro-texture 210 may have the same thickness or, in other embodiments, the lines comprising the macro-texture 210 may have differing thicknesses. In one or more embodiments, the lines comprising the macro-texture 210 may be evenly spaced apart or, in other embodiments, the lines comprising the macro-texture 210 may be unevenly spaced apart. The spacing between the lines that comprise the macro-texture is not particularly limited and will be constrained only by the materials being used to form the housing 102 and the apparatus used to form the macro-texture.

In some embodiments, the macro-texture has a maximum limiting dimension. The maximum limiting dimension does not include the depth of the macro-texture measured into the thickness of the housing. As used herein, "maximum limiting dimension" refers to a dimension limited by the apparatus that is used to form the macro-texture or the material from which the housing is made. For instance, in an enclosed geometry, such as, for examples, a circle, a polygon, or a similar geometrical shape (such as, for example, the bubble-like geometries depicted in FIG. 2A), the maximum limiting dimension is the maximum length of a line that is drawn from one side of the geometry to another side of the geometry. For example, and with reference again to FIG. 2A, the maximum limiting dimension of the bubble-like geometries is referred to as "d". It should be understood that each of the bubble-shaped geometries depicted in FIG. 2A has a maximum limiting dimension d. In a macro-texture that is linearly shaped (whether it is a straight line as depicted in FIG. 2B or linear design such as a chevron, crosshatch, etc.) the maximum limiting dimension is the thickness of any individual line that makes up the linear shape. For instance, in FIG. 2B, the maximum limiting dimension of the lines is referred to as "d". It should be understood that each of the lines has a maximum limiting dimension d.

In some embodiments, the maximum limiting dimension of the macro-texture is from greater than or equal to 50 µm to less than or equal to 300 µm, such as from greater than or equal to 75 µm to less than or equal to 300 µm, from greater than or equal to 100 µm to less than or equal to 300 µm, from greater than or equal to 125 µm to less than or equal to 300 µm, from greater than or equal to 150 µm to less than or equal to 300 µm, from greater than or equal to 175 µm to less than or equal to 300 µm, from greater than or equal to 200 µm to less than or equal to 300 µm, from greater than or equal to 225 µm to less than or equal to 300 µm, from greater than or equal to 250 µm to less than or equal to 300 µm, or from greater than or equal to 275 µm to less than or equal to 300 µm. In other embodiments, the maximum limiting dimension is from greater than or equal to 50 µm to less than or equal to 275 µm, from greater than or equal to 50 µm to less than or equal to 250 µm, from greater than or equal to 50 µm to less than or equal to 225 µm, from greater than or equal to 50 µm to less than or equal to 200 µm, from greater than or equal to 50 µm to less than or equal to 175 µm, from greater than or equal to 50 µm to less than or equal to 150 µm, from greater than or equal to 50 µm to less than or equal to 125 µm, from greater than or equal to 50 µm to less than or equal to 100 µm, or from greater than or equal to 50 µm to less than or equal to 75 µm. In one or more embodiments, the maximum limiting dimension is from greater than or equal to 75 µm to less than or equal to 275 µm, such as from greater than or equal to 100 µm to less than or equal to 250 µm, from greater than or equal to 125 µm to less than or equal to 225 µm, or from greater than or equal to 150 µm to less than or equal to 200 µm. It should be understood that the above ranges include all subranges within the stated ranges.

In some embodiments, the macro-texture may have a flattened upper surface, such as, for example, the bubble-shaped geometries depicted in FIG. 2A. In such embodiments, the macro-texture may have a minimum radius of curvature from greater than or equal to 5 µm to less than or equal to 10 µm, such as from greater than or equal to 6 µm to less than or equal to 10 µm, from greater than or equal to 7 µm to less than or equal to 10 µm, from greater than or equal to 8 µm to less than or equal to 10 µm, or from greater than or equal to 9 µm to less than or equal to 10 µm. In other embodiments, the macro-texture may have a minimum radius of curvature from greater than or equal to 5 µm to less than or equal to 9 µm, such as from greater than or equal to 5 µm to less than or equal to 8 µm, from greater than or equal to 5 µm to less than or equal to 7 µm, from greater than or equal to 5 µm to less than or equal to 6 µm. In one or more embodiments, the macro-texture may have a minimum radius of curvature from greater than or equal to 6 µm to less than or equal to 9 µm, such as from greater than or equal to 7 µm to less than or equal to 8 µm. It should be understood that the above ranges include all subranges within the stated ranges.

Figure 3A:
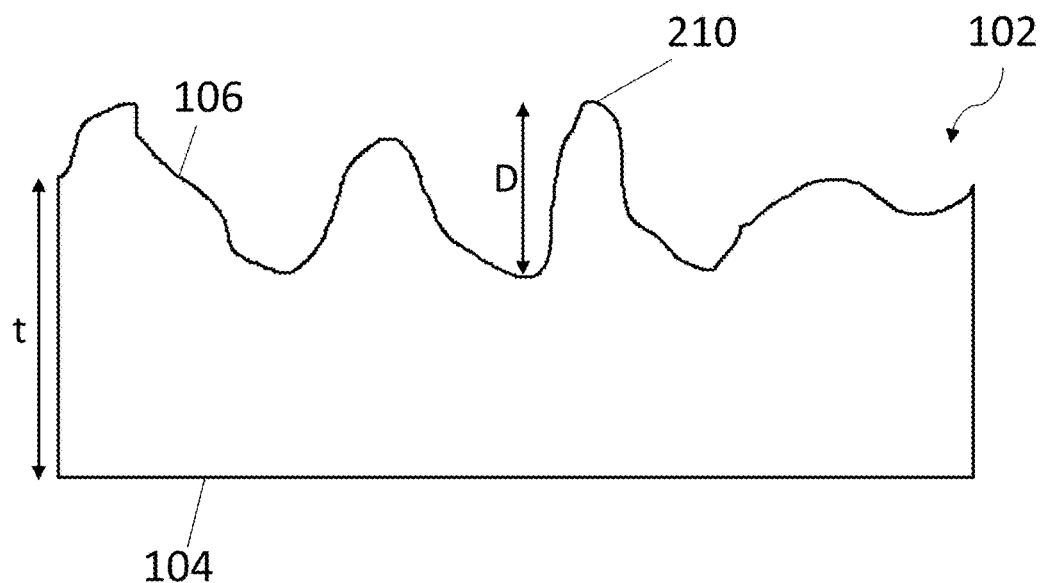
FIGS. 3A and 3B schematically depict cross section views of ceramic materials having macro-textures according to embodiments disclosed and described herein.
Figure 3B:
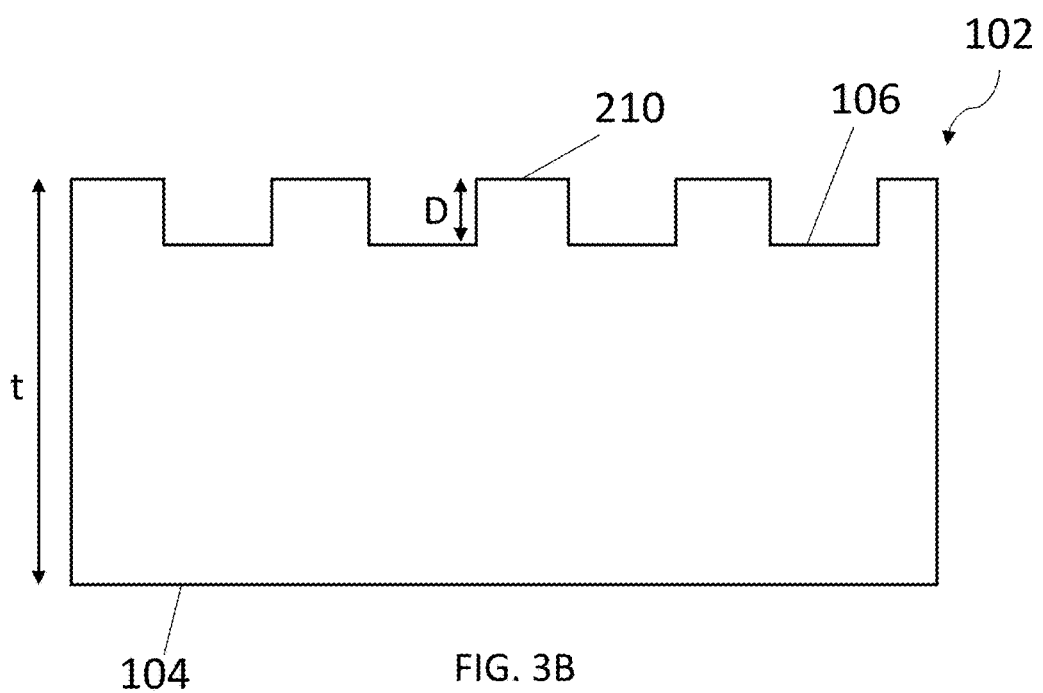

In addition to the maximum limiting dimension, the macro-texture 210 has a prescribed depth that extends into the thickness of the housing. With reference now to FIG. 3A, which depicts a cross-section of a housing 102 that comprises a macro-texture 210 having a bubble-like geometry as depicted in FIG. 2A, the depth of the macro-texture 210 is measured as a distance "D" from a peak of the macro-texture 210 to the adjacent valley of the macro-texture extending into the thickness "t" of the housing 102. With reference now to FIG. 3B, which depicts a cross-section of a housing 102 that comprises a macro-texture 210 having a linear geometry as depicted in FIG. 2B, the depth of the macro-texture 210 is measured as a distance "D" from maximum height of the macro-texture 210 to the adjacent valley of the macro-texture extending into the thickness "t" of the housing 102. As used herein, the depth of the macro-texture may be expressed as a percentage of the thickness t of the housing 102. As an example, as used herein, where the depth D of the macro-texture is 15% of the thickness t and the thickness t of the housing is 2 mm, the measured depth D of the macro-texture is 0.3 mm (15%·2 mm). Alternatively, the depth D of the macro-texture may be referred to as its measured depth, for example 0.3 mm.

According to some embodiments, the depth D of the macro-texture is from greater than or equal to 10% to less than or equal to 15% of the thickness t of the housing, such as from greater than or equal to 11% to less than or equal to 15% of the thickness t of the housing, from greater than or equal to 12% to less than or equal to 15% of the thickness t of the housing, from greater than or equal to 13% to less than or equal to 15% of the thickness t of the housing, or from greater than or equal to 14% to less than or equal to 15% of the thickness t of the housing. In other embodiments, the depth D of the macro-texture is from greater than or equal to 10% to less than or equal to 14% of the thickness t of the housing, such as from greater than or equal to 10% to less than or equal to 13% of the thickness t of the housing, from greater than or equal to 10% to less than or equal to 12% of the thickness t of the housing, or from greater than or equal to 10% to less than or equal to 11% of the thickness t of the housing. In one or more embodiments, the depth D of the macro-texture is from greater than or equal to 11% to less than or equal to 14% of the thickness t of the housing, such as from greater than or equal to 12% to less than or equal to 13% of the thickness t of the housing. It should be understood that the above ranges include all subranges within the stated ranges.

In some embodiments, the depth D of the macro-texture may be from greater than or equal to 50 µm to less than or equal to 750 µm, such as from greater than or equal to 75 µm to less than or equal to 750 µm, from greater than or equal to 100 µm to less than or equal to 750 µm, from greater than or equal to 125 µm to less than or equal to 750 µm, from greater than or equal to 150 µm to less than or equal to 750 µm, from greater than or equal to 175 µm to less than or equal to 750 µm, from greater than or equal to 200 µm to less than or equal to 750 µm, from greater than or equal to 225 µm to less than or equal to 750 µm, from greater than or equal to 250 µm to less than or equal to 750 µm, from greater than or equal to 275 µm to less than or equal to 750 µm, from greater than or equal to 300 µm to less than or equal to 750 µm, from greater than or equal to 325 µm to less than or equal to 750 µm, from greater than or equal to 350 µm to less than or equal to 750 µm, from greater than or equal to 375 µm to less than or equal to 750 µm, from greater than or equal to 400 µm to less than or equal to 750 µm, from greater than or equal to 425 µm to less than or equal to 750 µm, from greater than or equal to 450 µm to less than or equal to 750 µm, from greater than or equal to 475 µm to less than or equal to 750 µm, from greater than or equal to 500 µm to less than or equal to 750 µm, from greater than or equal to 525 µm to less than or equal to 750 µm, from greater than or equal to 550 µm to less than or equal to 750 µm, from greater than or equal to 575 µm to less than or equal to 750 µm, from greater than or equal to 600 µm to less than or equal to 750 µm, from greater than or equal to 625 µm to less than or equal to 750 µm, from greater than or equal to 650 µm to less than or equal to 750 µm, from greater than or equal to 675 µm to less than or equal to 750 µm, from greater than or equal to 700 µm to less than or equal to 750 µm, or from greater than or equal to 725 µm to less than or equal to 750 µm. In other embodiments, the depth D of the macro-texture may be from greater than or equal to 50 µm to less than or equal to 725 µm, from greater than or equal to 50 µm to less than or equal to 700 µm, from greater than or equal to 50 µm to less than or equal to 675 µm, from greater than or equal to 50 µm to less than or equal to 650 µm, from greater than or equal to 50 µm to less than or equal to 625 µm, from greater than or equal to 50 µm to less than or equal to 600 µm, from greater than or equal to 50 µm to less than or equal to 575 µm, from greater than or equal to 50 µm to less than or equal to 550 µm, from greater than or equal to 50 µm to less than or equal to 525 µm, from greater than or equal to 50 µm to less than or equal to 500 µm, from greater than or equal to 50 µm to less than or equal to 475 µm, from greater than or equal to 50 µm to less than or equal to 450 µm, from greater than or equal to 50 µm to less than or equal to 425 µm, from greater than or equal to 50 µm to less than or equal to 400 µm, from greater than or equal to 50 µm to less than or equal to 375 µm, from greater than or equal to 50 µm to less than or equal to 350 µm, from greater than or equal to 50 µm to less than or equal to 325 µm, from greater than or equal to 50 µm to less than or equal to 300 µm, from greater than or equal to 50 µm to less than or equal to 275 µm, from greater than or equal to 50 µm to less than or equal to 250 µm, from greater than or equal to 50 µm to less than or equal to 225 µm, from greater than or equal to 50 µm to less than or equal to 200 µm, from greater than or equal to 50 µm to less than or equal to 175 µm, from greater than or equal to 50 µm to less than or equal to 150 µm, from greater than or equal to 50 µm to less than or equal to 125 µm, from greater than or equal to 50 µm to less than or equal to 100 µm, or from greater than or equal to 50 µm to less than or equal to 75 µm. In one or more embodiments, the depth D of the macro-texture is from greater than or equal to 75 µm to less than or equal to 725 µm, such as from greater than or equal to 100 µm to less than or equal to 700 µm, from greater than or equal to 125 µm to less than or equal to 675 µm, from greater than or equal to 150 µm to less than or equal to 650 µm, from greater than or equal to 175 µm to less than or equal to 625 µm, from greater than or equal to 200 µm to less than or equal to 600 µm, from greater than or equal to 225 µm to less than or equal to 575 µm, from greater than or equal to 250 µm to less than or equal to 550 µm, from greater than or equal to 275 µm to less than or equal to 525 µm, from greater than or equal to 300 µm to less than or equal to 500 µm, from greater than or equal to 325 µm to less than or equal to 475 µm, from greater than or equal to 350 µm to less than or equal to 450 µm, or from greater than or equal to 375 µm to less than or equal to 425 µm. In still another embodiment, the depth D of the macro-texture is from 100 µm to 500 µm. It should be understood that the above ranges include all subranges within the stated ranges.

As described above, according to some embodiments, a predetermined micro-texture (also referred to herein as "micro-texture") is disposed on at least a portion of the back 106 of the housing 102 that comprises the macro-texture 210. According to some embodiments, the micro-texture provides a hydrophobic and/or an oleophobic surface to the housing 102. This hydrophobic and/or oleophobic surface prevents build up of water and/or oil that can decrease the aesthetic effect of the housing. In addition, aqueous residues and oils that build up on the housing can harbor contagions.

The geometry of the micro-texture is, according to some embodiments, a periodic, repeating array of geometrical or linear shapes. Additionally, in one or more embodiments, a micro-texture is disposed on the macro-texture, which provides the benefits of the hydrophobic and/or oleophobic attributes referenced above to the macro-texture. In some embodiments, the micro-texture may also be disposed on portions of the housing where the macro-texture is not present.

Figure 4:
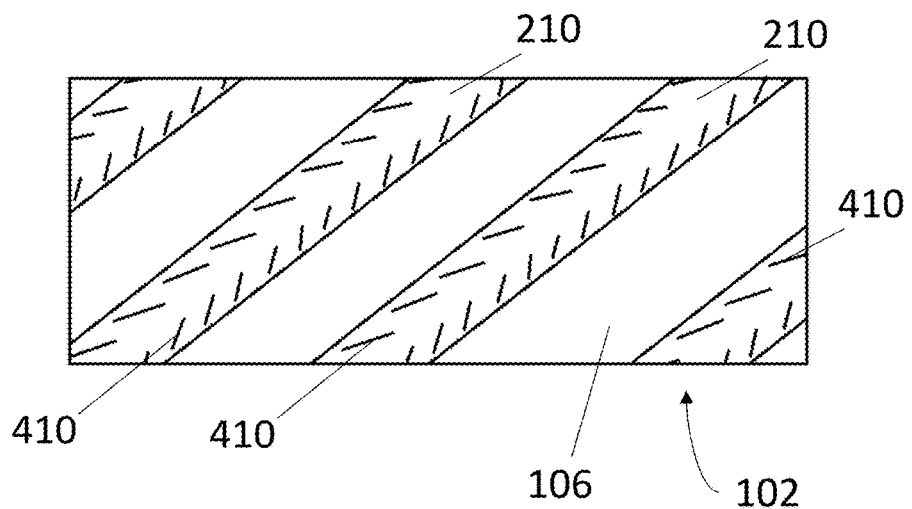
FIG. 4 schematically depicts a plan view of a ceramic material having a micro-texture according to embodiments disclosed and described herein.

With reference now to embodiments depicted in FIG. 4, which is a schematic plan view of a portion of a housing 102 for an electronic device comprising a macro-texture 210 on the back 106 of the housing 102 and a micro-texture 410 disposed on the macro-texture 210, the macro-texture 210 may be a series of lines extending across at least a portion of the back 106 of the housing 102. In some embodiments, such as those depicted in FIG. 4, a predetermined micro-texture 410 is disposed on at least a portion of the macro-texture 210. As shown in the embodiment depicted in FIG. 4, the micro-texture 410 is disposed on only a portion of the macro-texture 210, but in other embodiments, the micro-texture 410 may be disposed on the entire macro-texture 210. The micro-texture 410 may, according to some embodiments, have different geometries. However, because the size of the micro-texture is small, in some embodiments, the micro-texture 410 is a periodic array or a repeating geometry. In the embodiment depicted in FIG. 4, the micro-texture has a linear geometry that repeats. However, in other embodiments, the micro-texture may have other geometries, such as, for example, dots or polygons. In one or more embodiments, the micro-texture comes to a point so that it has a needle-like structure that is particularly useful as a hydrophobic and/or oleophobic surface. The geometry of the micro-texture may be "predetermined," which, as used herein, means that the geometry of the micro-texture is purposefully selected for a specific attribute, such as hydrophobicity and/or oleophobicity, and the housing is formed to have the selected geometry of the micro-texture.

In some embodiments, the micro-texture has a maximum limiting dimension. Although significantly smaller, the maximum limiting dimension of the micro-texture is measured in the same way as the maximum limiting dimension of the macro-texture disclosed above. In some embodiments, the maximum limiting dimension of the micro-texture is from greater than or equal to 1 µm to less than or equal to 20 µm, such as from greater than or equal to 2 µm to less than or equal to 20 µm, from greater than or equal to 4 µm to less than or equal to 20 µm, from greater than or equal to 6 µm to less than or equal to 20 µm, from greater than or equal to 8 µm to less than or equal to 20 µm, from greater than or equal to 10 µm to less than or equal to 20 µm, from greater than or equal to 12 µm to less than or equal to 20 µm, from greater than or equal to 14 µm to less than or equal to 20 µm, from greater than or equal to 16 µm to less than or equal to 20 µm, or from greater than or equal to 18 µm to less than or equal to 20 µm. In other embodiments, the maximum limiting dimension is from greater than or equal to 1 µm to less than or equal to 18 µm, from greater than or equal to 1 µm to less than or equal to 16 µm, from greater than or equal to 1 µm to less than or equal to 14 µm, from greater than or equal to 1 µm to less than or equal to 12 µm, from greater than or equal to 1 µm to less than or equal to 10 µm, from greater than or equal to 1 µm to less than or equal to 8 µm, from greater than or equal to 1 µm to less than or equal to 6 µm, from greater than or equal to 1 µm to less than or equal to 4 µm, or from greater than or equal to 1 µm to less than or equal to 2 µm. In one or more embodiments, the maximum limiting dimension is from greater than or equal to 2 µm to less than or equal to 18 µm, such as from greater than or equal to 4 µm to less than or equal to 16 µm, from greater than or equal to 6 µm to less than or equal to 14 µm, or from greater than or equal to 8 µm to less than or equal to 12 µm. It should be understood that the above ranges include all subranges within the stated ranges.

Figure 5A:
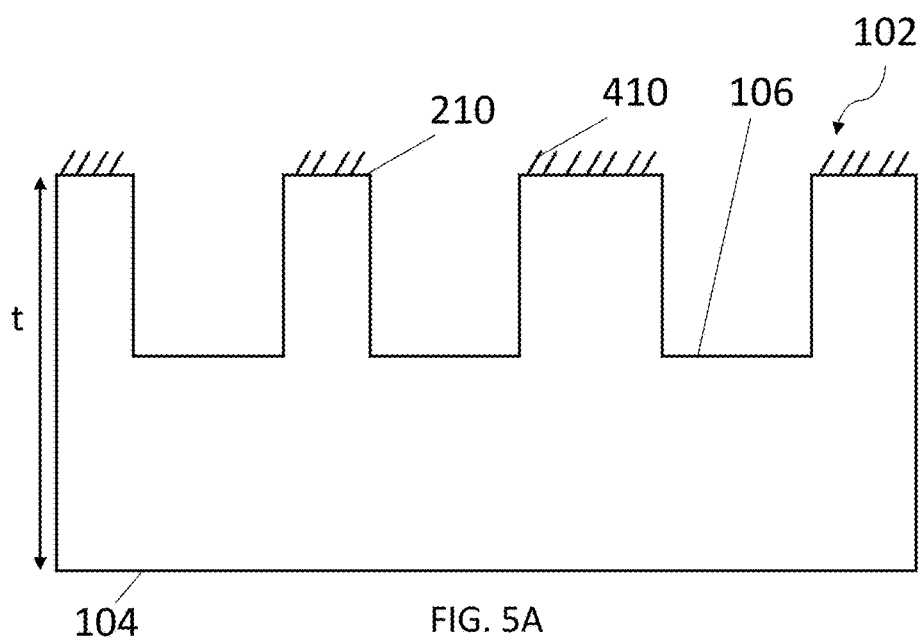
FIG. 5A schematically depicts a cross section view of a ceramic material having a micro-texture according to embodiments disclosed and described herein.
Figure 5B:
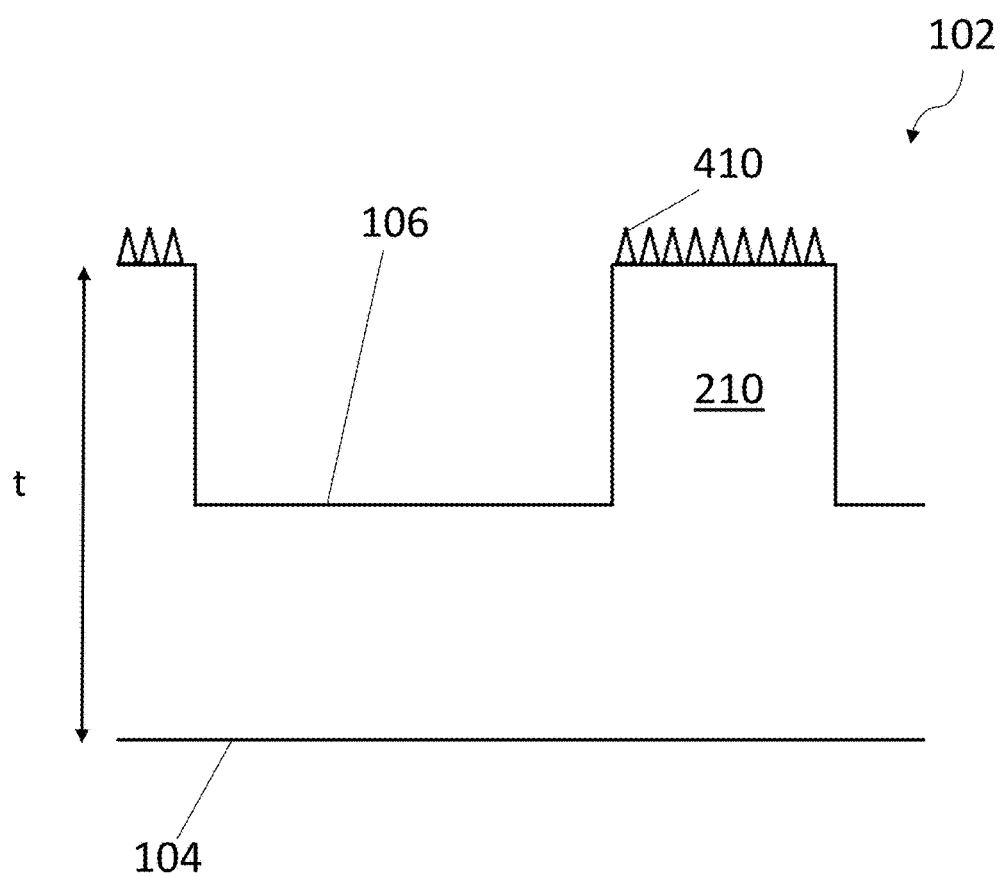
FIG. 5B schematically depicts a magnification of the cross section view of a ceramic material having a micro-texture as shown in FIG. 5A according to embodiments disclosed and described herein.

In addition to the maximum limiting dimension, the micro-texture 410 has a prescribed depth that extends into the thickness of the housing. With reference now to FIG. 5A, which depicts a cross-section of a housing 102 that comprises a macro-texture 210 having a linear geometry (such as the geometry depicted in FIG. 2B) and a micro-texture 410 disposed on a portion of the macro-texture 210. The depth of the micro-texture 410 is measured as a distance from a peak of the micro-texture 410 to an adjacent valley of the micro-texture 410 extending into the thickness "t" of the housing 102. FIG. 5B is an enlarged depiction of the cross section depicted in FIG. 5A that shows a specific geometry of the micro-texture 410.

According to some embodiments, the depth of the micro-texture is from greater than or equal to 1.0% to less than or equal to 1.5% of the thickness t of the housing, such as from greater than or equal to 1.1% to less than or equal to 1.5% of the thickness t of the housing, from greater than or equal to 1.2% to less than or equal to 1.5% of the thickness t of the housing, from greater than or equal to 1.3% to less than or equal to 1.5% of the thickness t of the housing, or from greater than or equal to 1.4% to less than or equal to 1.5% of the thickness t of the housing. In other embodiments, the depth of the micro-texture is from greater than or equal to 1.0% to less than or equal to 1.4% of the thickness t of the housing, such as from greater than or equal to 1.0% to less than or equal to 1.3% of the thickness t of the housing, from greater than or equal to 1.0% to less than or equal to 1.2% of the thickness t of the housing, or from greater than or equal to 1.0% to less than or equal to 1.1% of the thickness t of the housing. In one or more embodiments, the depth of the micro-texture is from greater than or equal to 1.1% to less than or equal to 1.4% of the thickness t of the housing, such as from greater than or equal to 1.2% to less than or equal to 1.3% of the thickness t of the housing. It should be understood that the above ranges include all subranges within the stated ranges.

In some embodiments, the depth of the micro-texture may be from greater than or equal to 0.1 µm to less than 50 µm, such as from greater than or equal to 1 µm to less than 50 µm, from greater than or equal to 5 µm to less than 50 µm, from greater than or equal to 10 µm to less than 50 µm, from greater than or equal to 15 µm to less than 50 µm, from greater than or equal to 20 µm to less than 50 µm, from greater than or equal to 25 µm to less than 50 µm, from greater than or equal to 30 µm to less than 50 µm, from greater than or equal to 35 µm to less than 50 µm, from greater than or equal to 40 µm to less than 50 µm, or from greater than or equal to 45 µm to less than 50 µm. In other embodiments, the depth of the micro-texture may be from greater than or equal to 0.1 µm to less than or equal to 45 µm, such as from greater than or equal to 0.1 µm to less than or equal to 40 µm, from greater than or equal to 0.1 µm to less than or equal to 35 µm, from greater than or equal to 0.1 µm to less than or equal to 30 µm, from greater than or equal to 0.1 µm to less than or equal to 25 µm, from greater than or equal to 0.1 µm to less than or equal to 20 µm, from greater than or equal to 0.1 µm to less than or equal to 15 µm, from greater than or equal to 0.1 µm to less than or equal to 10 µm, from greater than or equal to 0.1 µm to less than or equal to 5 µm, from greater than or equal to 0.1 µm to less than or equal to 1 µm, or from greater than or equal to 0.1 µm to less than or equal to 0.5 µm. In one or more embodiments, the depth of the micro-texture may be from greater than or equal to 0.5 µm to less than or equal to 45 µm, such as from greater than or equal to 1 µm to less than or equal to 40 µm, from greater than or equal to 5 µm to less than or equal to 35 µm, from greater than or equal to 10 µm to less than or equal to 30 µm, or from greater than or equal to 15 µm to less than or equal to 25 µm. It should be understood that the above ranges include all subranges within the stated ranges.

The dimensions of the micro-texture can be limited by the material used to form the housing. Specifically, the particle size of the material used to form the housing affects the dimensions of the micro-texture. As an example, the dimensions of the micro-texture cannot be smaller than the particle size of the material from which the housing is made. In some embodiments, the $d_{90}$ particle size of the material from which the housing is made is less than 0.1 times the size of the micro-texture, such as less than or equal to 0.09 times the size of the micro-texture, less than or equal to 0.08 times the size of the micro-texture, less than or equal to 0.07 times the size of the micro-texture, less than or equal to 0.06 times the size of the micro-texture, or less than or equal to 0.05 times the size of the micro-texture. It should be understood that the above ranges include all subranges within the stated ranges.

As used herein, $d_{90}$ particle size means that 90% of the particles have a particle size less than the recited value.

The housing 102 may be made of any suitable polycrystalline ceramic material that is radio frequency transparent, such as, for example, zirconia, alumina, carbides, nitrides, and mixtures thereof. However, in some embodiments, the housing 102 primarily comprises zirconia, which imparts strength and scratch resistance. In one or more embodiments, the housing 102 comprises at least 15 volume percent (vol %) zirconia, such as at least 20 vol % zirconia, at least 25 vol % zirconia, at least 30 vol % zirconia, at least 35 vol % zirconia, at least 40 vol % zirconia, at least 45 vol % zirconia, at least 50 vol % zirconia, at least 55 vol % zirconia, at least 60 vol % zirconia, at least 65 vol % zirconia, at least 70 vol % zirconia, at least 75 vol % zirconia, at least 80 vol % zirconia, or at least 85 vol % zirconia. It should be understood that the above ranges include all subranges within the stated ranges. In some embodiments, the zirconia is tetragonal zirconia. And, in one or more embodiments, the percentage of zirconia in the housing 102 that is tetragonal zirconia is at least 60 vol % of the zirconia, such as at least 65 vol % of the zirconia, at least 70 vol % zirconia, at least 75 vol % of the zirconia, at least 80 vol % of the zirconia, at least 85 vol % of the zirconia, at least 90 vol % of the zirconia, at least 95 vol % of the zirconia, or even 100 vol % of the zirconia. It should be understood that the above ranges include all subranges within the stated ranges.

In one or more embodiments, the tetragonal zirconia polycrystalline (TZP) ceramic material, has high strength and high toughness. The majority of the high toughness and strength is attributable to the phenomena called transformation toughening. If a crack or defect generates high stresses near the tip of the crack or defect, then a phase transformation occurs in the zirconia crystal structure, where the tetragonal crystal structure changes to a monoclinic crystal structure, the crystal expands by, for example, 3 to 5 volume %, and also exhibits shear deformations that are often accommodated by twining. This crystal volume expansion, in essence, squeezes the tip of the crack or defect closed (i.e., a form of self-healing), until additional stress is applied to make the crack propagate. After transformation, the twins in the monoclinic phase can sometimes shift orientation and size, responding to the exterior stress, and the reorientation can also lower the stress at the crack tip and absorb energy. This is called ferroelastic toughening. Some micro-nano cracking can also accompany the phase transformation near the crack tip, which lowers the effective elastic modulus near the crack and also helps prevent fracture of the monolithic body. TZP materials at room temperature are some of the strongest and toughest monolithic ceramics known.

In some embodiments, martensitic transformations cause a change in the periodic arrangement of the atoms in the transforming crystal. The martensitic phase transformation does not cause a chemistry change—no long range diffusion takes place. The martensitic transformation can often occur at very high speed within a crystal, approaching fractions of the speed of sound in the crystal. For zirconia, the most common transformation is from the tetragonal phase to the monoclinic phase (in some transmission electron microscopy (TEM) foils, tetragonal to orthorhombic transformations have been observed). It is difficult to capture the transformation while it is occurring with TEM or atomic force microscopy (AFM), particularly in tetragonal zirconia including stabilizing dopants of $Y^{+3}$, $Sc^{+3}$ or other rare earth+3 ions, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$ and $Lu^{+3}$.

Tetragonal zirconia crystals have coefficient of thermal expansion (CTE), optical index, and elastic modulus anisotropy. As a TZP is cooled from a sintering temperature, the CTE anisotropy produces stresses in the crystal grains with stress concentrations particularly near the grain boundaries, the triple points and the quad points, where three and four grains come together, respectively. As the grains become larger, these stresses become higher, as the stress relief mechanism of diffusional creep that occurs during cooling (Blendell and Coble, J. Am. Ceram. Soc. 65 [3] 174-178 (1982), Coble, J. Appl. Physics 34, 1679 (1963), Herring, J. Applied Physics, 21, 437 (1950)) becomes less effective due to the increased mass transport distance. Rounding of the triple and quad points by residual glass or intentionally added glass also reduces the stress concentration somewhat. Yttirum stabilized TZP (Y-TZP) usually spontaneously transforms to monoclinic upon cooling from the sintering temperature if the grain size is above about 3 to 5 microns, perhaps also depending upon the grain size distribution.

The Olsen-Cohen martensite nucleation theory (Met. Trans. A. Vol. 7A, No. 12, pp. 1897-1923), invokes a small array of dislocations/partial dislocations that create strain that nears then exceeds the transformation strain. The partial dislocations can evolve out of the grain boundary or a small dislocation array. The partial dislocations can create the atomic shuffles (not a full Burgers vector) needed for the phase transformation. The partials are glissile (i.e., capable of gliding) along the habit plane and when further stressed they move from the near grain boundary region and create laths of martensite, (monoclinic zirconia) across the grain. In zirconia, the transformation lath creates very high stresses in the nearby grain boundary region, creating more partial dislocations. The lath thickens as more partial dislocations are created at the grain boundary and glide at high velocity across the grain. As the strain at the nucleation interface becomes too large, partial dislocations (or misfit dislocations) of the opposite sign are created that are glissile, and when they move they generate a twin (nano and microcracks can also occur at the grain boundary, or where the transforming monoclinic lath contacts an already transformed monoclinic region). In a sample of $ZrO_2$—TiN these partial dislocations have been captured in a TEM micrograph (Wu, et al., J. Am. Ceram. Soc., 94 [7] 2200-2212 (2011)).

Y-TZP transformations have been referred to as "hard" while ceria stabilized TZP (Ce-TZP) transformations were referred to as "soft". This characterization combined both the extreme under cooling Y-TZP exhibited vs. the smaller under cooling of Ce-TZP and the stress needed to trigger the transformation. One theory is that this is due to the association of ytrrium+3 ions in the zirconium+4 cation sublattice in zirconia alloys with oxygen vacancies due to unlike (nominal) charge association. With cerium zirconia alloys, the cerium is mostly in the +4 ionic state. Oxygen vacancies are much less common than in Y-TZP (in Ce-TZP alloys vacancies are due mainly to the small minority of $Ce^{+3}$ cations). The +2, +3 dopant and the oxygen vacancies induced by the alio-valent dopant can form associated defect structures. These defect structures can be 2 yttrium ions and one oxygen vacancy, a trimer, where the yttrium ions are near the oxygen vacancy. When the partial dislocations start moving through the zirconia alloy lattice, they must rearrange the oxygen vacancy and yttrium ion defect trimer in Y-TZP. This causes a partial charge separation that absorbs a great deal of energy and prevents the partial dislocation from starting to move easily. In contrast a Ce-TZP has little or no charge separation to contend with and only a starting energy difference due to size consideration for the different Ce positions in the evolving monoclinic vs. tetragonal crystal structures.

Another theory is that all +2, and +3 cation-TZP alloys will associate with the oxygen vacancies. +4 stabilization aids will not have such associations, but will have strain energy considerations based on ion size. +5 and +6 toughening agents compensate for some of the +2 and +3 dopants and reduce the number of oxygen vacancies. The +5 and +6 toughening agents will associate with the +2 and +3 cations based primarily on effective charge neutralization of the +4 cation sub-lattice and secondarily on size considerations.

A secondary issue is that with alio-valent cations, there will be a space charge layer of increased or decreased concentration of the cation near the grain boundary. In Y-TZP this can be a yttrium ion concentration up to about three times the level of the 3 mole % $Y_2O_3$ in the bulk of the grain. The nucleation event starting at the grain boundary will encounter this space charge region. Thus the energy needed to drive the nucleation (partial dislocations) will be considerably higher with a higher concentration of trimers. The partial dislocation needs to separate the charges somewhat during its motion. With +4 cations of stabilizers and stabilizing aids, only the size misfit stress, that can be slightly reduced at the grain boundary, would cause a concentration gradient of the non-zirconium ions from the grain boundary to the interior of the grain.

Auto-catalytic transformations are usually found with higher toughness TZP's, either Ce-TZP's or those with large grain sizes and including toughening agents. Regular transformation zones in Y-TZP near cracks can be quite small, on the order of a micron or so, only a few grains away from a crack tip. In contrast an auto-catalytic transformation zone near a crack can be tens of microns thick. With an auto-catalytic transformation reaction, the stress in a grain local to the crack (probably at the tip to the blade of transforming monoclinic martensite) sets up a high enough stress that a grain further away from the transformed (transforming) grain also beings transforming, initiating the transformation in a grain further away, and so on.

In addition to the ceramic materials, such as, for example, zirconia, alumina, carbides, nitrides, etc., the composition that comprises the housing 102 may include various conventional additives for ceramics. One type of additive that may be included in the composition that comprises the housing 102 is colorants. Colorants may be used to impart a desired color to the housing, thereby providing a desired aesthetic effect and personalization to the housing. In some embodiments, the colorants may be metal oxides selected from the group consisting of cobalt oxide, copper oxide, iron oxide, or mixtures thereof. In some embodiments, the colorants can be added to a ceramic batch so that they are present in the green ceramic material before it is formed and sintered.

Methods for manufacturing a housing according to some embodiments will now be described. In one or more embodiments, the micro-texture is formed on the green ceramic material subsequent to formation of the macro-texture. The green ceramic material may comprise a binder and powdered ceramic material. The binder may, in some embodiments, be a polymer binder. In one or more embodiments, the polymer binder may include, for example, poly vinyl alcohol, acrylics, poly vinyl butyral, poly ethylene oxide and polyethylene glycols of various molecular weights, polyvinyl pyrrolidone, cellulosics such as hydroxymethylcellulose, hydroxyethylcellulose and hydroxyproplycellulose, gums such as agar gum and gum Arabic, acrylics, vinylacrylics, acrylic acids, polyacrylamides, starches or other combinations and permutations of binders known in the art. Alternately, the binder may contain an emulsion such as an acrylic emulsion with an aqueous liquid. Alternately, the green ceramic material may contain one or more binder precursors which form the binder upon heating, drying or exposure to radiation, such as acrylics such as poly methyl methacrylate, or condensation polymers, such as polyfunctional acids and glycols.

The ceramic powder present in the green ceramic material may, in some embodiments, primarily include zirconia. For instance, the ceramic powders may comprise at least 15 vol % zirconia, such as at least 20 vol % zirconia, at least 25 vol % zirconia, at least 30 vol % zirconia, at least 35 vol % zirconia, at least 40 vol % zirconia, at least 45 vol % zirconia, at least 50 vol % zirconia, at least 55 vol % zirconia, at least 60 vol % zirconia, at least 65 vol % zirconia, at least 70 vol % zirconia, at least 75 vol % zirconia, at least 80 vol % zirconia, or at least 85 vol % zirconia. The remainder of the ceramic powders may comprise alumina, carbides, nitrides, and mixtures thereof.

According to some embodiments, the micro-texture may be formed in a green ceramic material, such as, for example, a green ceramic sheet, by tape casting over an embossed polymer or metal carrier sheet. One exemplary method for tape casting is disclosed in U.S. Pat. No. 8,894,920, which is incorporated herein by reference in its entirety. In some embodiments, after the cast green ceramic material is released, a polymer, such as an acrylic, for example, may be cast over the micro-texture that was formed in the green ceramic material. In some embodiments, the micro-texture formed from the tape-casting process may be located on the ceramic material, such as, for example, a ceramic sheet, so that the micro-texture is disposed on a portion of the green ceramic material that will also have a macro-texture. In other embodiments, the micro-texture may be formed on the entirety of the green ceramic material. It should be understood that tape casting is only one, exemplary method for forming the micro-texture on a green ceramic material, and other processes for forming the micro-texture on the green ceramic material may be used. For example, the ceramic material may be formed by extrusion, pressing, hipping, and spark plasma sintering. The geometry of the micro-texture is predetermined and the micro-texture is formed to meet the predetermined geometry, thereby forming a predetermined micro-texture.

In one or more embodiments, the macro-texture may be formed by embossing the green ceramic material comprising the micro-texture. In some embodiments, the green ceramic material comprising the micro-texture is contacted with a mold or stamp that comprises a mirror image of the geometry of the macro-texture. Pressure is then applied to the mold or stamp to emboss the macro-texture onto the green ceramic material. It should be understood that the pressure needed to emboss the green ceramic material will vary depending on the composition of the green ceramic material and the desired depth of the macro-texture. After a suitable duration has passed, the mold or stamp and the green ceramic material are separated. In one or more embodiments, an intermediate material may be placed between the green ceramic material and the mold or stamp to prevent the green ceramic material from adhering to the mold or stamp upon separation. It should be understood that the parameters of the embossing process, such as temperature, duration, pressure, etc., will vary depending on the green ceramic material and the binder system that is used.

It should be understood that in one or more embodiments, the green ceramic material may have a laminated structure, where multiple layers of green ceramic material are adhered to one another. This laminated structure may then be embossed as described above. In some embodiments that comprise a laminated structure, it should be understood that the outermost layer of the laminated structure is the layer that comprises the micro-texture. Accordingly, the outermost layer of the laminated structure will have been tape casted or embossed with the micro-texture while the other layers of the laminated structure do not comprise the micro-texture. In some embodiments, the pressure from embossing the macro-texture to the laminated structure helps to adhere the layers of the laminated structure to one another.

Once the green ceramic material has been embossed with the macro-texture, the green ceramic material may be sintered to form the ceramic material that comprises the housing of a portable electronic device. The sintering of the green ceramic material includes heating the green ceramic material to temperatures from greater than or equal to 1300° C. to less than or equal to 1450° C. for a duration from greater than or equal to 1 hour to less than or equal to 5 hours. It should be understood that other suitable sintering steps and parameters may be used according to some embodiments. Once sintered, the ceramic body may be mechanically combined with other components of the portable electronic device.

Clauses of embodiments are provided below.

A first clause comprises a housing for a portable electronic device, comprising: a radio frequency transparent polycrystalline ceramic portion comprising a first surface and a second surface parallel to the first surface; wherein the radio frequency transparent polycrystalline ceramic portion comprises a macro-texture on at least a portion of the first surface, wherein a predetermined micro-texture is disposed on at least a portion of the macro-texture, and the predetermined micro-texture has a depth that is less than a depth of the macro-texture.

A second clause comprises the housing for a portable electronic device of the first clause, wherein the depth of the macro-texture is from greater than or equal to about 50 μm to less than or equal to 750 μm.

A third clause comprises the housing for a portable electronic device of any one of the first and second clauses, wherein the depth of the predetermined micro-texture is from greater than or equal to 0.1 μm to less than 50 μm.

A third clause comprises the housing for a portable electronic device of any one of the first to third clauses, wherein a thickness between the first surface and the second surface is less than or equal to 3 mm.

A fifth clause comprises the housing for a portable electronic device of any one of the first to fourth clauses, wherein the depth of the macro-texture is from greater than or equal to 10% of the thickness between the first surface and the second surface to less than or equal to 15% of the thickness between the first surface and the second surface.

A sixth clause comprises the housing for a portable electronic device of any one of the first to fifth clauses, wherein the depth of the predetermined micro-texture is from greater than or equal to 1% of a thickness between the first surface and the second surface to less than or equal to 1.5% of the thickness between the first surface and the second surface.

A seventh clause comprises the housing for a portable electronic device of any one of the first to sixth clauses, wherein the radio frequency transparent polycrystalline ceramic portion comprises greater than or equal to 15 volume percent zirconia.

An eighth clause comprises the housing for a portable electronic device of any one of the first to seventh clauses, wherein at least 60 volume percent of the zirconia is tetragonal phase zirconia.

A ninth clause comprises the housing for a portable electronic device of any one of the first to eighth clauses, wherein the radio frequency transparent polycrystalline ceramic portion comprises greater than or equal to 75 volume percent zirconia.

A tenth clause comprises the housing for a portable electronic device of any one of the first to ninth clauses, wherein the radio frequency transparent polycrystalline ceramic portion comprises one or more colorants.

An eleventh clause comprises a method for manufacturing a housing for a portable electronic device, comprising: forming a green ceramic article comprising a first surface and a second surface parallel to the first surface; embossing at least a portion the first surface of the green ceramic article with a macro-texture; and sintering the green ceramic article comprising the macro-texture and the predetermined micro-texture to form a sintered ceramic article, wherein a predetermined micro-texture is disposed on at least a portion of the macro-texture, and the predetermined micro-texture has a depth that is less than a depth of the macro-texture, and wherein the sintered ceramic article is a radio frequency transparent polycrystalline ceramic.

A twelfth clause comprises the method of the eleventh clause, wherein the depth of the macro-texture is from greater than or equal to 10% of a thickness between the first surface and the second surface to less than or equal to 15% of a thickness between the first surface and the second surface.

A thirteenth clause comprises the method of any one of the eleventh and twelfth clauses, wherein the depth of the predetermined micro-texture is from greater than or equal to 1% of the thickness between the first surface and the second surface to less than or equal to 1.5% of the thickness between the first surface and the second surface.

A fourteenth clause comprises the method of any one of the eleventh to thirteenth clauses, wherein green ceramic article comprises a laminated structure prior to embossing the green ceramic article with the macro-texture.

A fifteenth clause comprises the method of any one of the eleventh to fourteenth clauses, wherein an outermost layer of the laminated structure comprises the predetermined micro-texture prior to embossing the green ceramic article with the macro-texture.

A sixteenth clause comprises the method of any one of the eleventh to fifteenth clauses, wherein the predetermined micro-texture is formed on the outermost layer of the laminated structure by embossing or tape casting over a textured carrier web.

A seventeenth clause comprises the method of any one of the eleventh to sixteenth clauses, wherein a polymer is filled into the predetermined micro-texture prior to embossing the laminated structure with the macro-texture.

An eighteenth clause comprises the method of any one of the eleventh to seventeenth clauses, wherein the radio frequency transparent polycrystalline ceramic comprises greater than or equal to 15 volume percent zirconia.

A nineteenth clause comprises the method of any one of the eleventh to eighteenth clauses, wherein the green ceramic article comprises colorants.

A twentieth clause comprises a portable electronic device, comprising: the housing of any one of the first to tenth clauses; electrical components provided at least partially within the housing, the electrical components including at least a controller, a memory, and a display, the display being provided at or adjacent to the second surface of the housing; and a cover substrate disposed over the display.

EXAMPLES

Embodiments will be further clarified by the following non-limiting examples.

Example 1

Ceramic sheets for use in the following examples were formed as follows.

Zirconia dielectric powder in a tape castable form was obtained from Sinocera Technologies, China. A tape casting slurry of the nominal composition (by volume): zirconia G3Y-010NO (20.0%)—Butvar B-98 (5.5%)—Solutia, anhydrous ethanol (41.7%)—Pharmco-AAPER, 1-butanol (26.8%)—Fisher Scientific, dibutyl phalate (5.0%)—ACROS ORGANICS, and Phospholan PS-236 (1.0%)—AkzoNobel, was prepared.

The formation of the binder solution was completed by a two-step process. In the first step, 75% of the total ethanol, and all of the butanol, dibutyl phalate, and PS-236 was measured into a clean bottle. This mixture was then rolled overnight on a rapidly rotating roller mill—in the absence of media—to fully dissolve the Butvar into the solvent solution. The remaining 25% of the ethanol was measured out and reserved as a rinse for the bottle containing the other binder constituents. The zirconia was weighed out and set aside.

Attrition milling of the slurry constituents was undertaken using a Union Process Model HDDM-01 laboratory batch mill to thoroughly mix all ingredients and produce uniform slurry suitable for tape casting. The milling chamber (300 cc capacity) was filled with 2 mm zirconia media (3Y-TZP, Tosho, Japan) and the binder solution was added. The ethanol rinse was added to the bottle that previously contained the binder solution. The bottle was shaken and allowed to sit approximately 1 minute. The ethanol/binder rinse mixture from the bottle was then added to the mill. This final binder solution was milled at 500 RPM for 5 minutes. Lastly, the zirconia was added to the mill and the mill was brought up to 1300 RPM and mixed for 1 hour. The solvent solution's major constituents were balanced in such a way that a solvent based vacuum de-airable slurry was obtained when coupled with simultaneous mixing/agitation. After milling/mixing the slurry was then decanted from the media and de-aired using a Kurabo MAZERUSTAR KK-V360SS planetary mixer.

At this point the slurry was ready for tape casting. Casting was performed on a TAM Ceramics Inc. Cladan Model 164 Thick Films Caster. An 8 mil doctor blade was used in conjunction with a siliconized Mylar carrier film and the slurry was cast at a casting speed of 40 cm/min. This process yielded green tape thicknesses in the range of 60-80 microns post drying. Green tapes were then blanked to size and stacked to the desired green thickness to account for sintering shrinkage during firing. The green sheet stack was subsequently laminated uniaxially at 85° C., 1500 psi for 20 minutes in a Carver Auto Series NE press. Post uniaxial pressing the laminate was isostatically pressed at 85° C., 5000 psi for 20 minutes prior to sintering in a PTC—Pacific Trinetics Corp Model LT14001 isolaminator.

Figure 6:
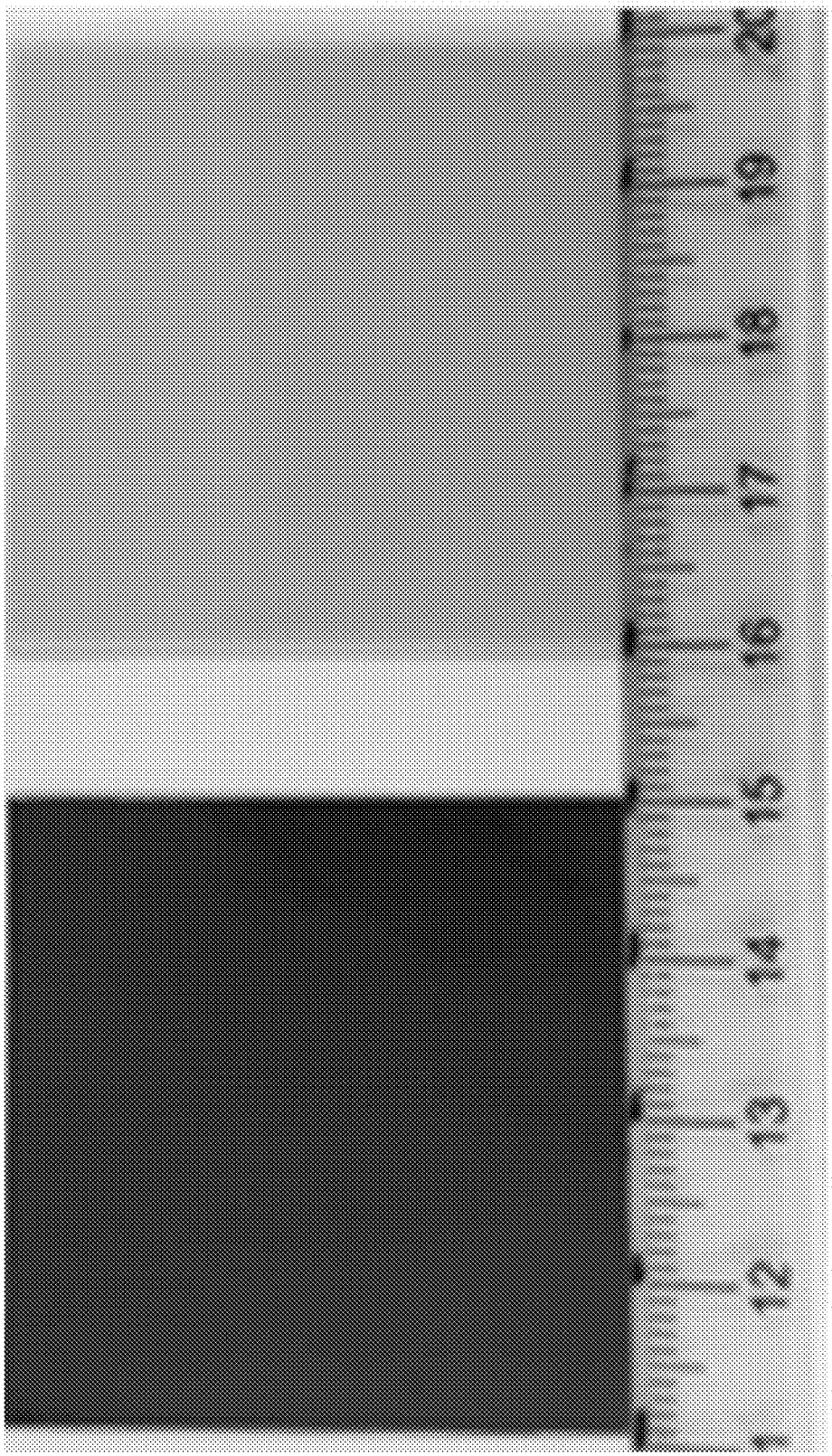
FIG. 6 is a photograph of two zirconia sheets formed according to embodiments disclosed and described herein.

The green laminate was then sintered between two Zircar ZAL-15AA fiber boards at 1350° C. for two hours following a 100° C./hr. heating schedule in a CM Inc. Rapid Temperature Furnace. Upon cooling, a 40 mm×40 mm dense monolithic zirconia plate with a thickness of about 500 µm that was suitable for a housing in a portable electronic device was obtained. This panel was later thrown approximately two feet in the air and allowed to drop to a tiled floor with no visible apparent damage to the plate. Black and pink versions of the fired ceramic plates are shown in FIG. 6.

Example 2

Figure 7:
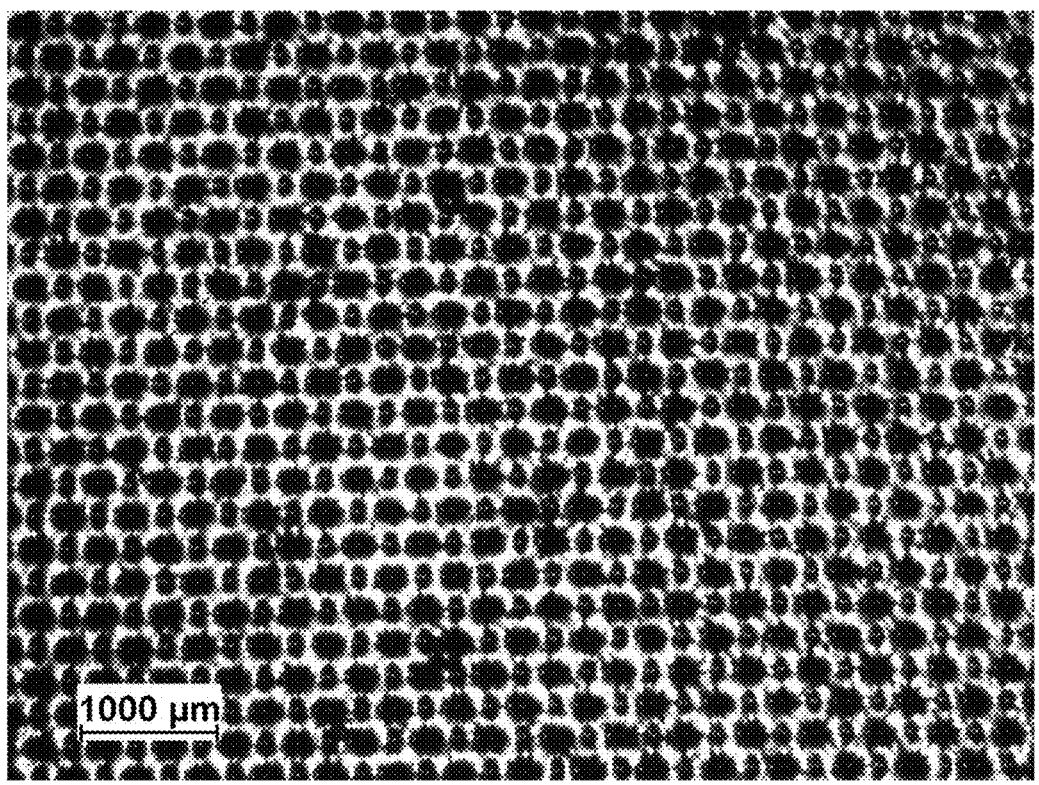
FIG. 7 is a magnified photograph of a ceramic sheet having a macro-texture according to embodiments disclosed and described herein.

This example used the unfired isostatically pressed green laminates produced in Example 1. A single layer of 60 mesh polyacrylate screen was placed on top of the laminate and isostatically pressed at 85° C. and 5000 psi for 20 minutes. Post lamination the screen was peeled off leaving an embossed impression of the screen texture on top of the laminate. The embossed green laminate was subsequently sintered between two Zircar ZAL-15AA fiber board setters at 1350° C. for two hours following a 100° C./hr. heating schedule. Upon cooling, a 40 mm×40 mm dense monolithic zirconia plate with a thickness of about 500 µm having a woven macro-texture that is suitable for use as a housing in a portable electronic device was obtained. This monolithic zirconia plate is shown in FIG. 7. This example demonstrates the viability of macro texture being imparted to the surface a fired monolithic zirconia plate via green state embossing. Similar examples such as herringbone and other aesthetically pleasing repeating macroscopic textures can easily be envisioned using this and extensible methods.

Example 3

Figure 8:
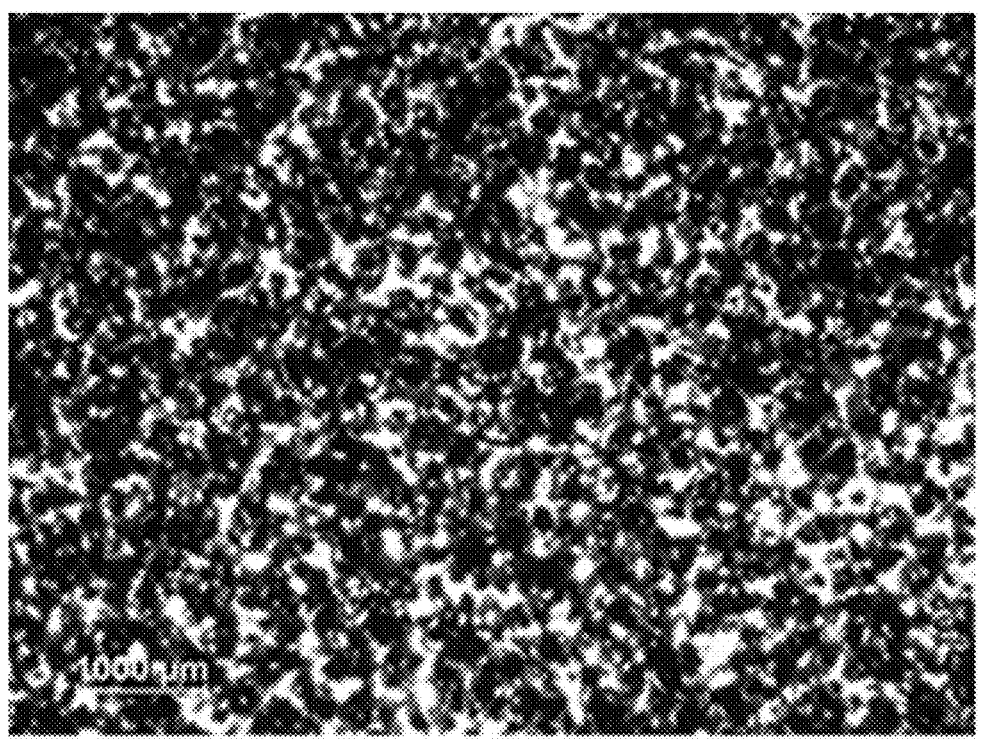
FIG. 8 is a magnified photograph of a ceramic sheet having a macro-texture according to embodiments disclosed and described herein.

This example used the unfired isostatically pressed green laminates produced in Example 1. A layer of Struers FEPA P#120 grit silicon carbide sand paper was placed on top of the laminate separated by an approximately 35 µm thick Mylar layer to reduce sticking and was isostatically laminated at 85° C. and 5000 psi for 20 minutes. Post lamination the Mylar and sand paper was peeled off of the laminate. The embossed green laminate was subsequently sintered between two Zircar ZAL-15AA fiber board setters at 1350° C. for two hours following a 100° C./hr. heating schedule. Upon cooling, a 40 mm×40 mm dense monolithic zirconia plate with a thickness of about 500 µm and having a roughened macro-texture that is suitable for use as a housing for a portable electronic device was obtained. The monolithic zirconia plate is shown in FIG. 8. This example demonstrates the viability of macro texture being imparted to the surface a fired monolithic zirconia plate via green state embossing.

Example 4

This example used the unfired isostatically pressed green laminates produced in Example 1. A patterned stamp was placed on top of a laminate separated by an approximately 35 µm thick Mylar layer to reduce sticking and isostatically laminated at 85° C. and 5000 psi for 20 minutes. Post lamination the Mylar and patterned stamp was peeled off of the laminate. The embossed green laminate was subsequently sintered between two Zircar ZAL-15AA fiber board setters at 1350° C. for two hours following a 100° C./hr. heating schedule. This example demonstrates the viability of design elements such as delicate writing/script (100-200 µm shown), image transfer, numbers, and various textures being imparted to the surface of a fired monolithic zirconia plate via green state embossing.

Figure 9:
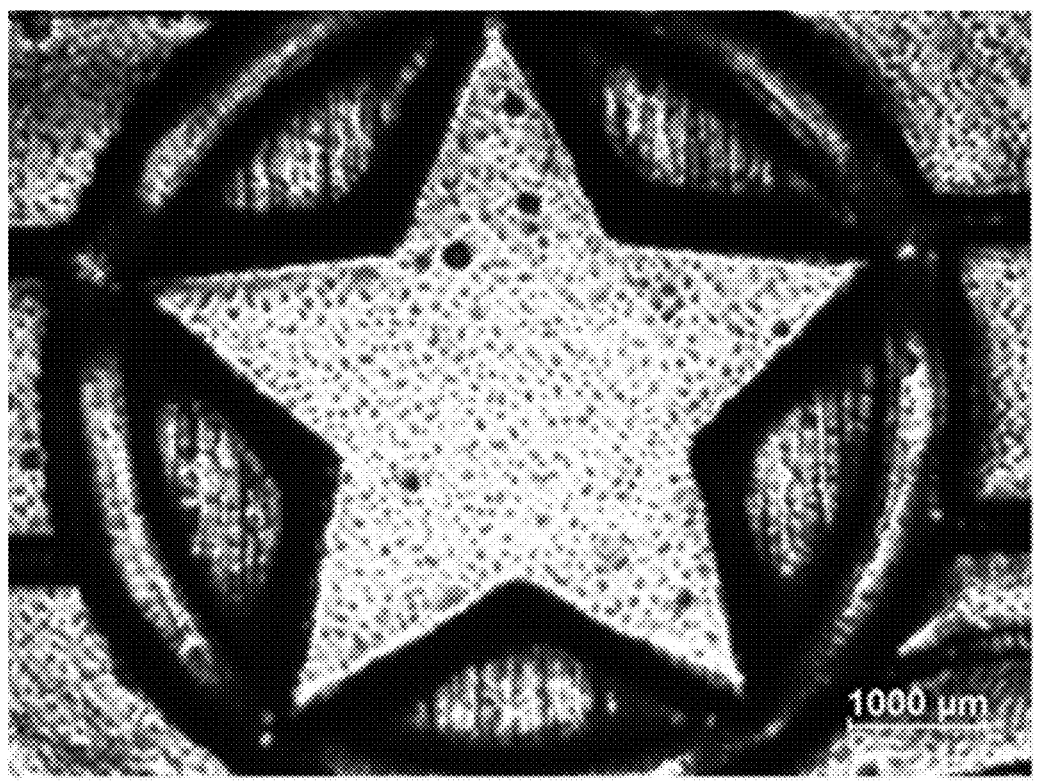
FIG. 9 is a magnified photograph of a ceramic sheet having a macro-texture according to embodiments disclosed and described herein.

FIG. 9 shows the pattern stamped on the zirconia sheet.

Example 5

Figure 10:
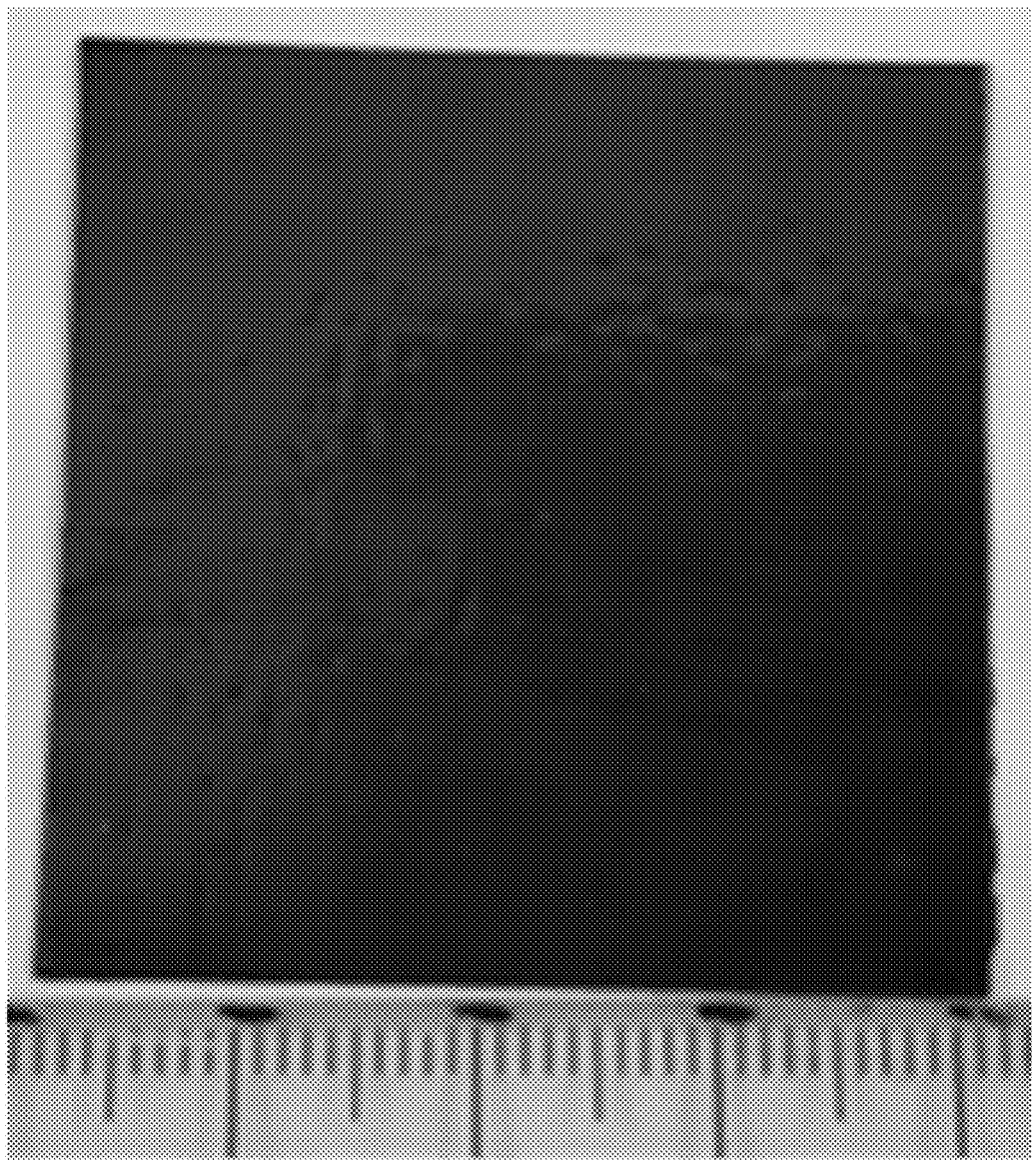
FIG. 10 is a photograph of a ceramic sheet having a macro-texture according to embodiments disclosed and described herein.

In this example, air in the form of large bubbles was introduced to the slurry prior to casting. The slurry was otherwise processed in an identical manner as outlined in Example 1. The resulting texture was a non-repeating dimpled pattern which proved to be not only aesthetically pleasing but to provide a surface more amenable to handling via reduced slippage. The ceramic sheet made according to this example is shown in FIG. 10.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A housing for a portable electronic device, comprising:
    a radio frequency transparent polycrystalline ceramic portion comprising a first surface and a second surface parallel to the first surface;
    wherein the radio frequency transparent polycrystalline ceramic portion comprises a macro-texture on at least a portion of the first surface, and
    wherein a predetermined micro-texture is disposed on at least a portion of the macro-texture, and the predetermined micro-texture has a depth that is less than a depth of the macro-texture.

2. The housing for a portable electronic device of claim 1, wherein the depth of the macro-texture is from greater than or equal to about 50 μm to less than or equal to 750 μm.

3. The housing for a portable electronic device of claim 1, wherein the depth of the predetermined micro-texture is from greater than or equal to 0.1 μm to less than 50 μm.

4. The housing for a portable electronic device of claim 1, wherein a thickness between the first surface and the second surface is less than or equal to 3 mm.

5. The housing for a portable electronic device of claim 4, wherein the depth of the macro-texture is from greater than or equal to 10% of the thickness between the first surface and the second surface to less than or equal to 15% of the thickness between the first surface and the second surface.

6. The housing for a portable electronic device of claim 4, wherein the depth of the predetermined micro-texture is from greater than or equal to 1% of a thickness between the first surface and the second surface to less than or equal to 1.5% of the thickness between the first surface and the second surface.

7. The housing for a portable electronic device of claim 1, wherein the radio frequency transparent polycrystalline ceramic portion comprises greater than or equal to 15 volume percent zirconia.

8. The housing for a portable electronic device of claim 7, wherein at least 60 volume percent of the zirconia is tetragonal phase zirconia.

9. The housing for a portable electronic device of claim 1, wherein the radio frequency transparent polycrystalline ceramic portion comprises greater than or equal to 75 volume percent zirconia.

10. The housing for a portable electronic device of claim 1, wherein the radio frequency transparent polycrystalline ceramic portion comprises one or more colorants.

11. A portable electronic device, comprising:
    the housing of claim 1;
    electrical components provided at least partially within the housing, the electrical components including at least a controller, a memory, and a display, the display being provided at or adjacent to the second surface of the housing; and
    a cover substrate disposed over the display.

12. A method for manufacturing a housing for a portable electronic device, comprising:
    forming a green ceramic article comprising a first surface and a second surface parallel to the first surface;
    embossing at least a portion the first surface of the green ceramic article with a macro-texture;
    disposing a predetermined micro-texture on the at least a portion of the first surface of the green ceramic article; and
    sintering the green ceramic article comprising the macro-texture and the predetermined micro-texture to form a sintered ceramic article,
    wherein a predetermined micro-texture is disposed on at least a portion of the macro-texture, and the predetermined micro-texture has a depth that is less than a depth of the macro-texture, and
    wherein the sintered ceramic article is a radio frequency transparent polycrystalline ceramic.

13. The method for manufacturing a housing for a portable electronic device of claim 12, wherein the depth of the macro-texture is from greater than or equal to 10% of a thickness between the first surface and the second surface to less than or equal to 15% of a thickness between the first surface and the second surface.

14. The method for manufacturing a housing for a portable electronic device of claim 12, wherein the depth of the predetermined micro-texture is from greater than or equal to 1% of the thickness between the first surface and the second surface to less than or equal to 1.5% of the thickness between the first surface and the second surface.

15. The method for manufacturing a housing for a portable electronic device of claim 12, wherein the green ceramic article comprises a laminated structure prior to embossing the green ceramic article with the macro-texture.

16. The method for manufacturing a housing for a portable electronic device of claim 15, wherein an outermost layer of the laminated structure comprises the predetermined micro-texture prior to embossing the green ceramic article with the macro-texture.

17. The method for manufacturing a housing for a portable electronic device of claim 16, wherein the predetermined micro-texture is formed on the outermost layer of the laminated structure by embossing or tape casting over a textured carrier web.

18. The method for manufacturing a housing for a portable electronic device of claim 17, wherein a polymer is filled into the predetermined micro-texture prior to embossing the laminated structure with the macro-texture.

19. The method for manufacturing a housing for a portable electronic device of claim 12, wherein the radio frequency transparent polycrystalline ceramic comprises greater than or equal to 15 volume percent zirconia.

20. The method for manufacturing a housing for a portable electronic device of claim 12, wherein the green ceramic article comprises colorants.

* * * * *